Dec. 14, 1965         J. S. GOLIGHTLY ET AL         3,223,505
METHOD FOR BENDING GLASS SHEETS TO COMPOUND CURVATURES
Original Filed Aug. 30, 1955                    12 Sheets-Sheet 1

INVENTORS
JAMES S. GOLIGHTLY
DAVID H. DOEHLERT and
BY CHARLES R. DAVIDSON, JR

Oscar L. Spencer
ATTORNEY

FIG. 3

INVENTORS
JAMES S. GOLIGHTLY
DAVID H. DOEHLERT and
BY CHARLES R. DAVIDSON, JR.

Oscar L Spencer
ATTORNEY

Dec. 14, 1965    J. S. GOLIGHTLY ET AL    3,223,505
METHOD FOR BENDING GLASS SHEETS TO COMPOUND CURVATURES
Original Filed Aug. 30, 1955    12 Sheets-Sheet 6

INVENTORS
JAMES S. GOLIGHTLY
DAVID H. DOEHLERT and
BY CHARLES R. DAVIDSON, JR Oscar L. Spencer
ATTORNEY Dec. 14, 1965     J. S. GOLIGHTLY ET AL     3,223,505

METHOD FOR BENDING GLASS SHEETS TO COMPOUND CURVATURES

Original Filed Aug. 30, 1955     12 Sheets-Sheet 7

INVENTORS
JAMES S. GOLIGHTLY
DAVID H. DOEHLERT and
BY CHARLES R. DAVIDSON, JR

Oscar L Spencer
ATTORNEY

Dec. 14, 1965    J. S. GOLIGHTLY ET AL    3,223,505
METHOD FOR BENDING GLASS SHEETS TO COMPOUND CURVATURES
Original Filed Aug. 30, 1955    12 Sheets-Sheet 10

FIG. 18

INVENTORS
JAMES S. GOLIGHTLY
DAVID H. DOEHLERT and
BY CHARLES R. DAVIDSON JR

Oscar L Spencer
ATTORNEY

FIG. 19

United States Patent Office 3,223,505
Patented Dec. 14, 1965

3,223,505
METHOD FOR BENDING GLASS SHEETS TO COMPOUND CURVATURES
James S. Golightly, Tarentum, David H. Doehlert, New Kensington, and Charles R. Davidson, Jr., Tarentum, Pa., assignors to Pittsburgh Plate Glass Company
Original application Aug. 30, 1955, Ser. No. 531,461. Divided and this application Nov. 25, 1960, Ser. No. 75,652
2 Claims. (Cl. 65—107)

The present application is a division of our application Serial No. 531,461 for "Method and Apparatus for Bending Glass Sheets to Compound Curvatures," filed August 30, 1955, now abandoned.

This application relates to method for bending glass sheets to compound curvatures. Specifically, the present invention relates to a method for providing the compound curvature to flat glass sheets necessary to bend the sheets into a configuration acceptable for the latest designs in vehicle glazing panels such as automotive windshields and backlights. Such designs require that the panels extend continuously from one side completely across the vehicle into the other side and include an additional auxiliary portion extending transversely of the longitudinal axis of the panel into the roof of the vehicle.

In order to bend glass sheets in two mutually perpendicular directions along axes having varying radii, many difficulties are encountered. Glass must be stretched unevenly during the bending operation, thereby causing optical distortion. In order to stretch glass in two mutually perpendicular directions, additional distortion is bound to occur. Furthermore, difficulties are encountered in reproducing such compound bends, especially when the windshields are produced at mass production rates.

When longitudinal and transverse bends are imparted to glass sheets in a non-continuous operation, such a process is too slow for mass production. It is far superior to perform the bending operation by a continuous process wherein flat glass sheets are mounted on a bending mold, conveyed continuously through a bending lehr and removed from the lehr in the compound shape desired. The present invention utilizes apparatus including novel mold and lehr structure capable of accomplishing the complex longitudinal bend and the complex transverse bend required for compound windshields independently of each other, thus minimizing the resultant distortion and problems of reproducing the manufactured articles at high rates of production within the small tolerances permitted by automobile manufacturers.

Bending molds typical of those employed for performing the present invention include a longitudinally extending center section comprising two spaced, longitudinally extending rails and outboard sections rotatable into one position for receiving flat glass sheets and into another position to provide with the central section a substantially continuous outline conforming in elevation and curvature to the outline desired for the bent glass sheets. The center section of the mold is modified so that at least a portion of one of the center section rails is made rotatable relative to the other longitudinally extending rail.

In a particularly efficient modification of such molds for performing the present invention, the rotatable rail of the center section is counterweighted for rotation about an axis substantially parallel to the longitudinal axis of the mold. The outboard sections are counterweighted about spaced axes extending angularly relative to the first axis of rotation. In addition, means are provided to inhibit the action of the counterweight to rotate the rotatable longitudinally extending rail of the center section until the counterweighted outboard sections rotate a predetermined amount, in certain cases sufficiently to have completed the longitudinal bending of the glass.

An object of the present invention is to provide a method for bending glass into compound shapes while the latter is conveyed continuously through a bending lehr.

Another object is to provide a continuous method of bending glass sheets into compound curvatures wherein the glass is bent along one axis and then along another axis perpendicular to the one axis while being conveyed continuously through a bending lehr.

Another object of the present invention is to provide a method for bending precut glass sheets into shapes having relatively gentle curvatures centrally thereof along the longitudinal axis merging into areas of rapidly increasing curvatures to form opposed end portions in substantially parallel but spaced planes, and wherein one longitudinal side of the glass is bent transversely of the sheet along an axis having a curvature of non-uniform severity.

The present invention will become apparent upon study of the following description of particular embodiments of our invention, wherein the accompanying drawings form a part of the disclosure. The description which follows is for illustration rather than limitation. Reference to the latter may be obtained by study of the claims forming part of this application.

In the drawings,

FIGURE 3 is a perspective view similar to FIGURE 2, showing the mold in its normally closed position forming a continuous skeleton frame conforming in both elevation and outline to the periphery of the bent glass sheet. In FIGURES 2 and 3, certain elements which do not contribute to the bending operation have been omitted for the sake of clarity.

Figure 1:
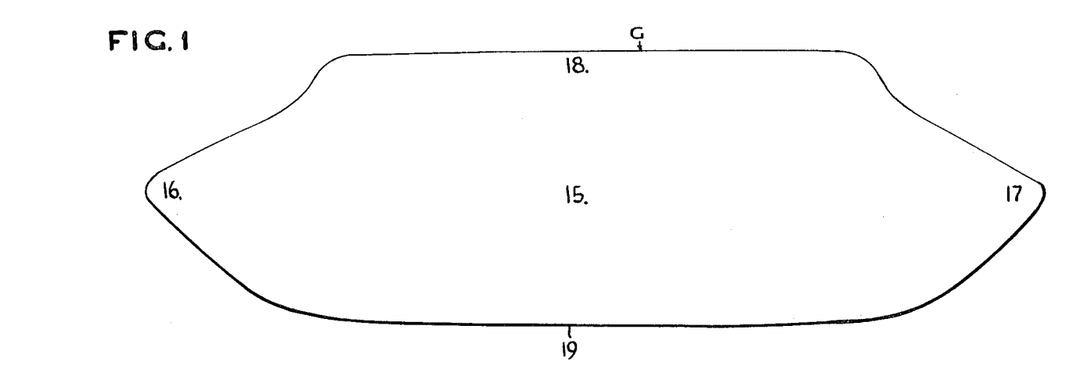
FIGURE 1 is a plan view of a flat sheet of glass precut to the outline desired preparatory to bending.
Figure 2:
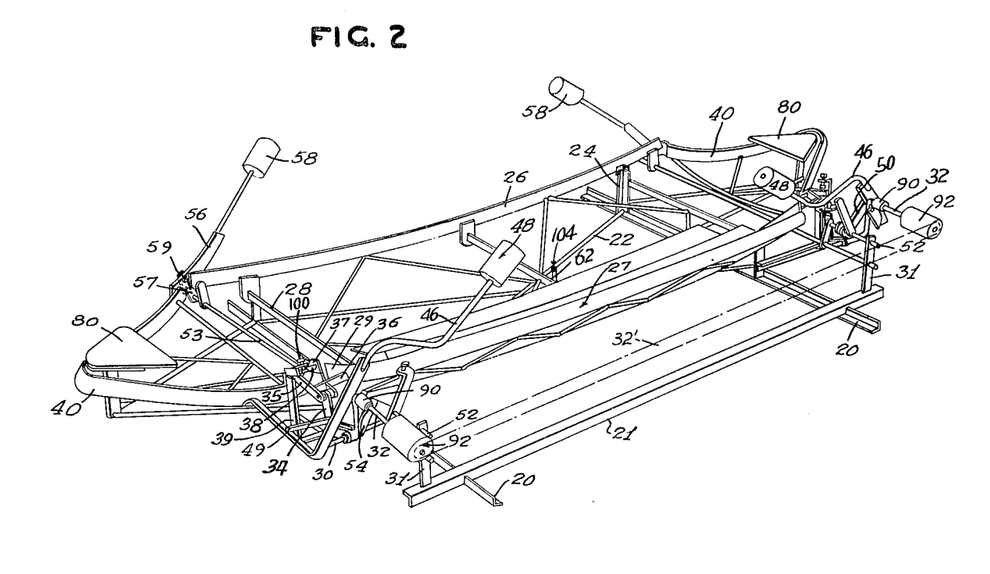
FIGURE 2 is a frontal perspective view of a typical bending mold according to the present invention showing the mold in open position for receiving a flat precut sheet of glass such as shown in FIGURE 1.
Figure 3:
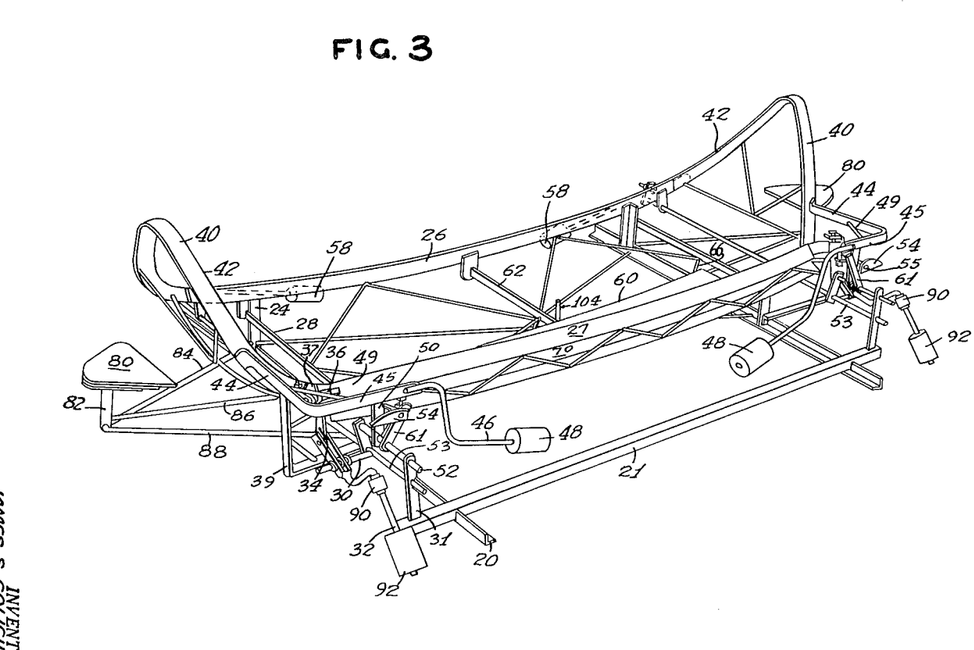
Figure 4:
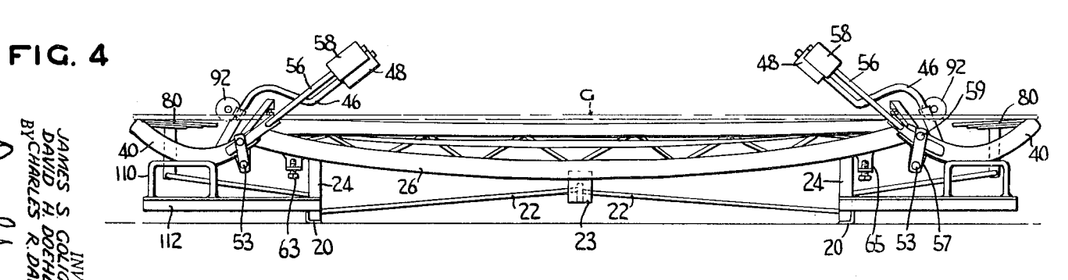
FIGURE 4 is a rear longitudinal elevation, partly in perspective, of the mold of FIGURE 2 loaded with a flat glass sheet precut for bending.
Figure 5:
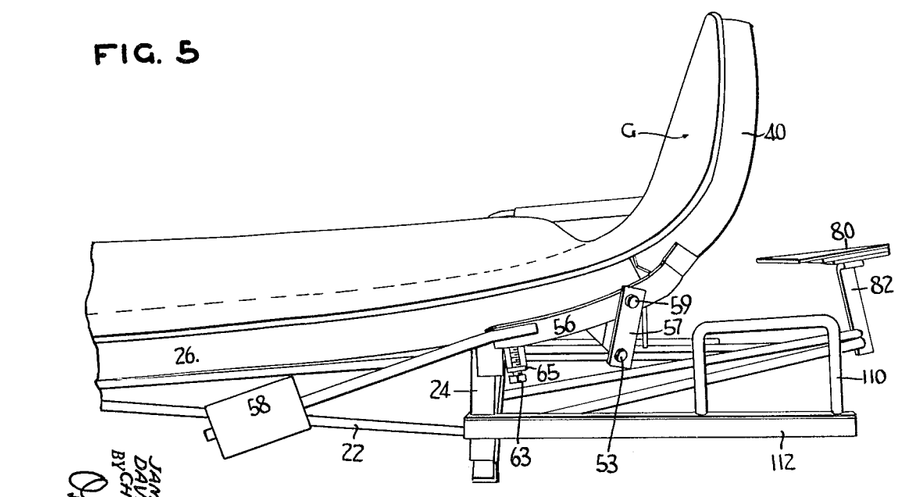
FIGURE 5 is a rear longitudinal elevation of a portion of the mold, as in FIGURE 4, after the glass sheet has been bent on the mold.
Figure 6:
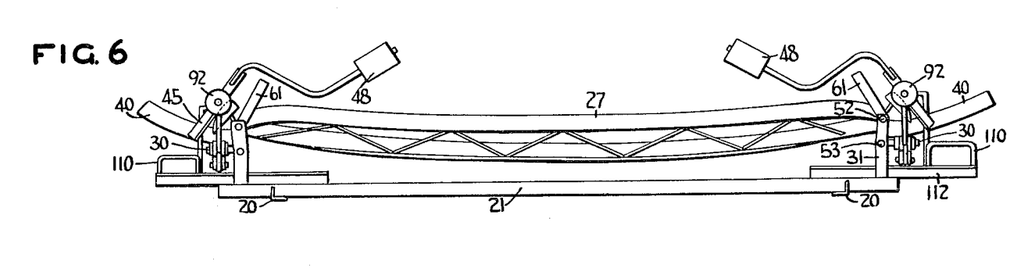
FIGURE 6 is a front longitudinal elevation of the mold opened for receiving a precut glass sheet, partly in perspective.
Figures 7, 8:
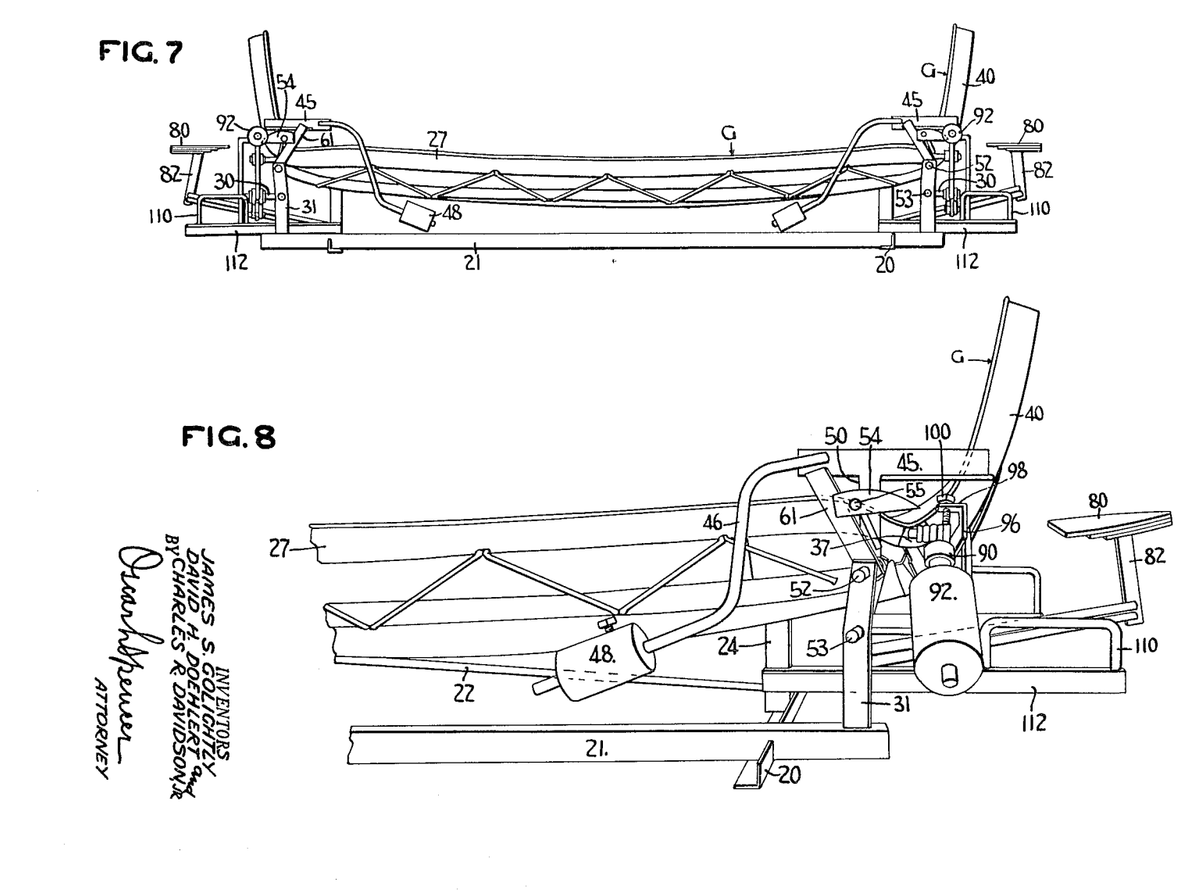
FIGURE 7 is a view similar to FIGURE 6, showing the glass loaded mold after the longitudinal bending has been almost completed but before the transverse bend has commenced.
FIGURE 8 is an enlarged front longitudinal elevation of a portion of the mold, similar to FIGURES 6 and 7, showing the portion after both longitudinal and transverse bending have been completed.
Figure 9:
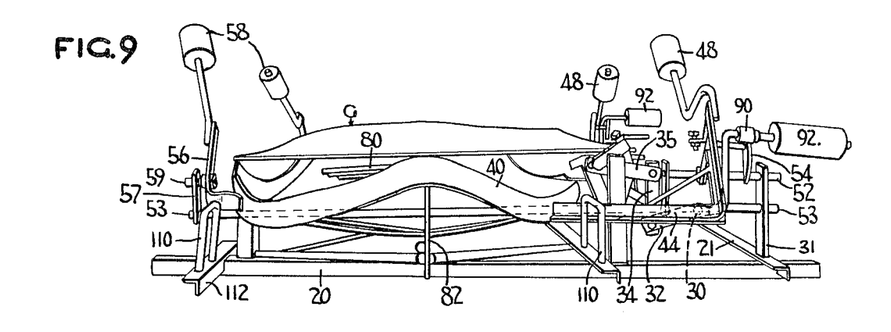
FIGURE 9 is an end elevation of the mold in the open position, partly in perspective.
Figure 10:
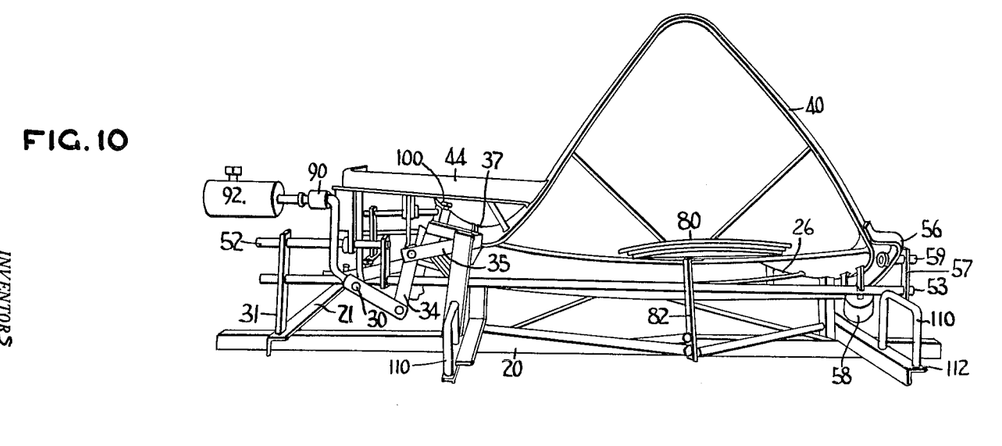
FIGURE 10 is an end elevation of the mold as in FIGURE 9 after the glass has been bent longitudinally, but before the transverse bend has been started.
Figure 11:
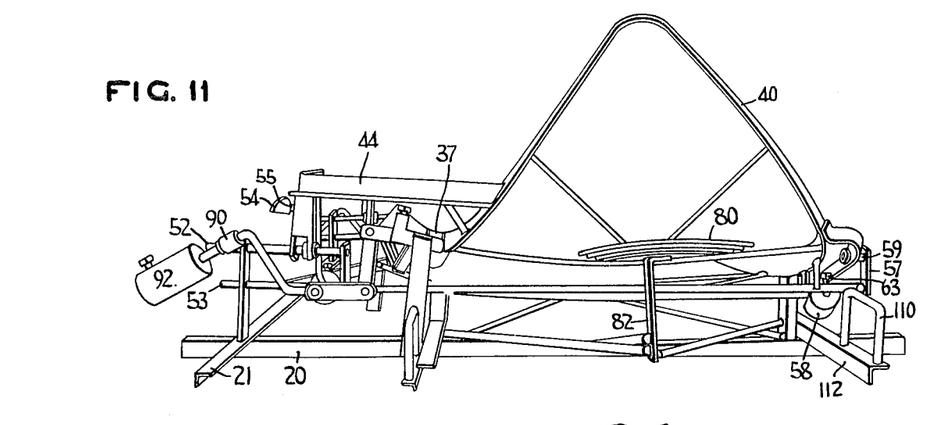
FIGURE 11 is an end elevation of the mold as in FIGURE 9 after both longitudinal and transverse bends have been completed.
Figure 12:
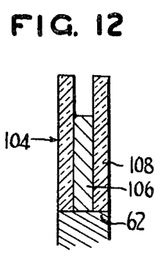
FIGURE 12 is a cross-sectional view of a sag indicating element useful with bending molds of the present type.

Referring to the drawings, FIGURE 1 shows a typical precut glass sheet G having a main central portion 15 of modified elliptical shape, merging at its longitudinal extremities into wing portions 16 and 17 adapted to be "wrapped around" the sides of an automobile, and an auxiliary portion 18 extending longitudinally along one side of the sheet. The latter portion is bent transversely of the main central portion 15 to extend into the roof of an automobile. The sheet includes another side 19 opposite auxiliary portion 18, which side forms the bottom of the bent panel as the latter is mounted in a vehicle.

Referring to FIGURES 2 through 12, various views of a typical particular embodiment of our invention are shown. This typical apparatus includes a pair of spaced L-beams 20 extending transversely of the mold, interconnected by a longitudinally extending L-beam 21 and struts 22 interconnecting beams 20 with a support bracket 23 to form a supporting frame for the bending mold. Vertically extending angle irons 24 interconnect crossbeams 20 with a fixed side rail 26 having an upper surface conforming to a portion of the margin desired for a bent glass sheet. Cross bars 28, which are fixed to the supporting frame to form part of its superstructure, extend transversely from adjacent the longitudinal extremities of the fixed side rail 26 to improve the structural rigidity of the mold. Opposing fixed side rail 26 and spaced laterally therefrom is a rotatable rail member 27 provided with opposite longitudinal extremities 29 that are bent laterally of the mold relative to its main portion.

A rod 30 is fixed to the mold support frame at each end thereof by virtue of its connection to a rod 53 rigidly secured to an upright 31 fixed to longitudinally extending L-beam 21. A counterweighted lever arm 32 has a bifurcated extension 33 pivotally attached about rod 30. A floating link 34 is pivoted at one end to the end of the bifurcated extension 33 and at its other end to an additional link 35. The latter, in turn, is pivoted at its other end to a bearing rod 38 rigidly connected to the mold support frame through a support post 39. A T-bar 36 has its stem pivoted to the pivotal connection between floating link 34 and additional link 35, while its cross member rigidly interconnects link 35 to each longitudinal extremity 29 of the rotatable rail 27. Adjacent the longitudinal extremities 29 of the rotatable rail 27, small fixed rails 37 are located. Each rail 37 is rigidly connected through a bearing rod 38 and support post 39 to the mold support structure. Rails 26, 27 and 37 provide the center section of the bending mold. Rails 26 and 37 are all fixedly attached to the supporting frame whereas rail 27 is hingedly connected thereto by virtue of the connection between the T-bar 36 and additional link 35 about bearing rod 38. The bearing rods 38 thus provide pivot means defining a longitudinal axis extending substantially parallel to rail member 26. Rail 27 is pivotable relative to this pivot means.

At each outboard extremity of the bending mold are provided wing sections 40. These wing sections are substantially C-shaped in contour and contain upper shaping surfaces 42 shaped to the contour desired for the opposing longitudinal extremities of the glass sheet.

At the front side of the bending mold containing the rotatable rail 27, the inboard extremity of each outboard molding section is provided with an angle bar comprising a lateral portion 44 bent into a longitudinal portion 45 extending longitudinally inboard of the bending mold. The longitudinal portion ends in an S-shaped lever arm 46 containing a counterweight 48 at its inboard extremity. The angle bar is braced by means of a bracing rod 49.

A lug 50 extends downwardly from the portion 45. The bottom of the lug 50 is apertured to receive a bearing rod 52, fixed to the upright 31 of the supporting frame to provide a bearing for rotation of the lug 50 about the bearing rod. Upright 31 is also connected to a thin transverse connector rod 53. A cam 54 is attached to lug 50 by a stud 55.

At the rear side of the mold containing the fixed center section rail 26, arms 56 extend longitudinally inboard from their places of attachment to the outboard mold sections 40. Apertured lugs 57 extend upwardly from the opposite end of the transverse connector rod 53 held by lug 31. Counterweights 58 may be attached to the inboard extremities of arms 56.

Counterweighted arm 56 is rotatable about stub bearing 59 carried by lug 57. The stub bearing is aligned with hinge rod 52 to provide an axis of rotation for each outboard mold member 40 and its attached cam 54 relative to the center molding section fixed to the mold. The counterweights 48 and 58 urge the outboard mold members into a closed mold position. A stop bar 61 prevents the outboard members 40 from rotating beyond their desired rotation by abutment by stud 55. At the rear, set screws 63 are adjustable in apertured flanged tabs 65 to enable arms 56 to contact the upper extremity of set screw 63 simultaneously with the engagement of stud 55 with stop bar 61, thus improving the rigidity of the mold in closed position.

In order to enhance the selective heating of the different portions of the glass sheet mounted for bending the glass to extremely severe transverse curvatures, a longitudinally extending sheet of heat reflective material 60 may be provided as part of the superstructure of the supporting frame to underlie the glass. Sheet 60 may be attached to a recessed central cross-rod 62 and to some of the reinforcement braces 66 which form part of the mold supporting frame, as well as cross bars 28. Also, additional plates 70 of heat reflective material may be secured to the rotatable rail 27 to enhance the heat applied to the region of the glass sheet to be bent transversely. These sheets may have their upper surfaces slightly concavely shaped transversely of the mold to enhance the desired effect.

Heat abstractor plates 80 are optionally secured to the supporting frame for the fixed center rail 26 by means of vertical posts 82 and rods 84, 86 and 88 which interconnect the bottom of posts 82 with either cross-beams 20 or vertically extending angle irons 24. The heat abstractor plates 80 underlie the outboard sections of the mold when the latter are rotated into an open mold position. Their purpose is to abstract heat reradiated by the longitudinal extremities of glass sheets mounted for bending on the mold, thus preventing undue curling of the glass at its longitudinal extremities.

In order to receive flat glass sheets preparatory to mounting, it is necessary that the outboard mold sections 40 be rotated into their outward positions. Counterweighted lever arms 32 are provided with a roller 90 and a counterweight 92. Thus, by lifting the counterweights 92, floating links 34 and crank arms 35 move the angled connector rods 36 in such a manner that rail member 27 is rotated into a lower position. Rotation of the outboard members 40 to a spread position causes cams 54 to move into position beneath the lifted rollers 90 mounted on the counterweighted lever arm 32. Thus, the mold may be opened and locked transversely. The cams 54 and the counterweighted lever arms 32 thus constitute cooperating cam members that behave as inhibiting means to prevent rotation of rail members 27 from its lowered position for supporting the flat glass sheet to its upper position to support the bent glass sheet.

One or more flat glass sheets precut to the outline desired for the finally bent sheet are laid on the open mold and are supported at their longitudinal extremities 16 and 17 by the outboard extremity of the outboard sections 40, at their side extremity 19 by the longitudinal extremities of the upper shaping surface of rail 26, and at their side extremity 18 by the downwardly rotated rail 27 and the small fixed rails 37. The glass laden mold is then conveyed into a bending lehr, where the glass and the mold are soaked with heat to bring them to glass softening temperatures. The rotational moments provided by the counterweights 48 and 58 lift the outboard wing sections 40 whenever the glass is softened sufficiently so that its resistance to this rotational action is decreased because of the decreasing viscosity of the glass as its temperature rises.

As the wing members rotate from the open to the closed position, cams 54 move toward the center of the mold. At the moment the longitudinal bend is substantially completed, cams 54 are rotated out of or disconnected from supporting engagement with rollers 90. When the latter are no longer supported by cams 54, counterweighted lever arms 32 operate through their linkages 34, 35 to lift rotatable rail 27, thus raising the rail-supported, heat-softened side extremity 18 of the glass. Lever arms 32 may be interconnected, for example, by a connector bar 32' depicted in phantom in FIGURE 2, so that both cams must be removed from contact with rollers 90 before counterweights 92 can bear their moments of force on the glass. This eliminates any warpage of rail member 27 because of the imposition of unequal forces by the counterweights at different positions thereof, and any lack of constancy in the transverse bend that would result from one end of the softened portion 18 being subjected to mechanical lifting before the other.

As stated previously, overbending of the wing members 40 relative to the fixed rails 26 and 36 is prevented by the engagement of stud 55 with stop member 61, and the simultaneous engagement of arm 56 with set screw 63. Similarly, excessive rotation of the rotatable rail member 27 is prevented by means of a stop member 96 comprising an apertured lug 98 through which is screw threaded a set screw 100. Stop member 96 is supported by post 39, which also supports pivot rod 38. When rotatable rail section 27 has been rotated the desired amount, additional link 35 contacts the bottom surface of set screw 100, thus preventing further rotation.

Another feature of our apparatus that may be included is a sag indicating means exemplified by a vertical finger 104, (FIGURE 12) which extends upwardly from the depressed center cross rod 62 within the outline of the mold to the height designed to touch the glass when the latter sags. Finger 104 comprises a metal rod 106 fixed securely at its bottom to cross rod 62 and a sleeve 108 of flexible refractory material such as a fiberglass product fixed to the rod and having its upper half inch extending beyond the rod to the elevation conforming to that desired for the sagged central portion of the glass sheet. The flexible refractory material is positioned intermediate rails 26 and 27 and below their shaping surfaces to face the undersurface of a supported glass sheet and is capable of deflecting when contacted by a sagged portion of the glass sheet, thereby indicating the amount of sag developed in the glass sheet.

Best results are obtained for extremely severe compound curvatures when the longitudinal bend is completed before the mechanical force is applied to aid the transverse bend, since glass is difficult to stretch in two directions simultaneously. However, if the glass is maintained at its elevated temperature beyond the time required for the bending to be accomplished, an unwanted sag is imparted to the glass. The provision of the fingers 104 enables operators to view the progress of the longitudinal bend through windows disposed along the side walls of the bending lehr.

The position of the undersurface of the glass relative to the fingers indicates the proper time for the transverse bend to commence. Experience determines the optimum position in the lehr for this to take place. Thus, if the finger sleeve 108 is deflected to indicate the glass is sagging too rapidly, the rate of bending may be decreased. Conversely, the bending rate may be increased whenever the sleeve 108 indicates that the bend has not progressed sufficiently.

A handle 110 is provided at each corner of the bending mold to facilitate handling, either by the personnel working in the bending department or by automatic handling equipment. Each handle 110 may comprise a U-shape pipe or rod fixed at its extremities to an angle iron 112 extending outwardly of the cross beams 20.

In the embodiment described above, the cams 54 are engageable with the rollers 90 of the counterweighted lever arms 32 to provide inhibiting means in operative connection to the pivotable rail 27 through elements 32 to 36, inclusive, to prevent rotation of said pivotable rail 27 about bearing rods 38 by locking rail member 27 in a fixed position, the weights 48 and 58, attached to the wing sections 40 and to the cam 54, provide tripping means for moving the inhibiting means out of operative connection with the pivotable rail member 27, and the weights 92 operating through weight arms 32, floating links 34, additional links 35 and T-bars 36, serve as actuating or urging means to rotate pivotable rail 27 about the longitudinal axis provided by bearing rods 38 when the inhibiting means is out of operative connection with the pivotable rail 27.

Figure 13:
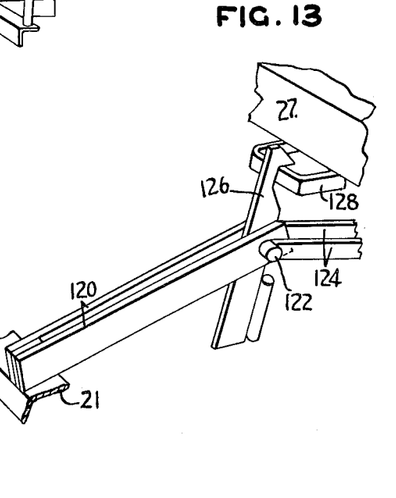
FIGURE 13 is a perspective view of a portion of a mold showing an alternative triggering device for the present invention in the locked position.
Figure 14:
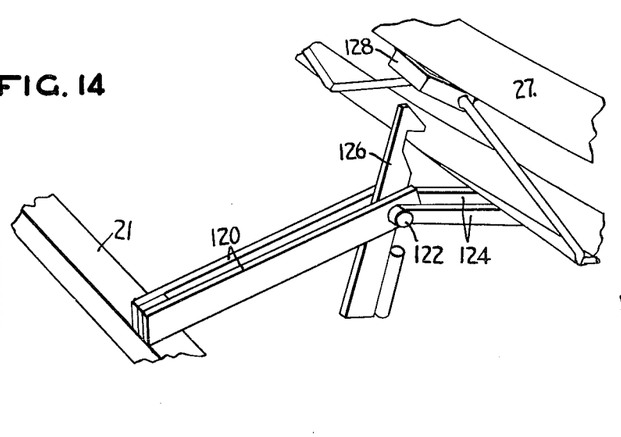
FIGURE 14 is a view similar to FIGURE 13, showing the triggering device in the tripped position.

Referring specifically to FIGURES 13 and 14, an alternate construction of inhibiting means, tripping means, and actuating or urging means is disclosed. This alternative construction includes a bifurcated hinge arm 120 fixed to the leading longitudinally extending L-beam 21 of the mold support frame and a hinge rod 122 connecting the bifurcated ends. Oblique arms 124 fix the hinge rod to the substructure of the support frame. A freely pivotable latch 126 is mounted for rotation about hinge rod 122. An eye 128 of formed steel is attached as by welding to the bottom of rotatable rail member 27. Normally, latch 126 engages eye 128 to serve as a means inhibiting rotation of rail member 27. However, when the latch is caused to rotate out of engagement with eye 128, rail member 27 is free to rotate in response to the urging of the counterweights 92 to cause the transverse bend in the glass.

Figure 15:
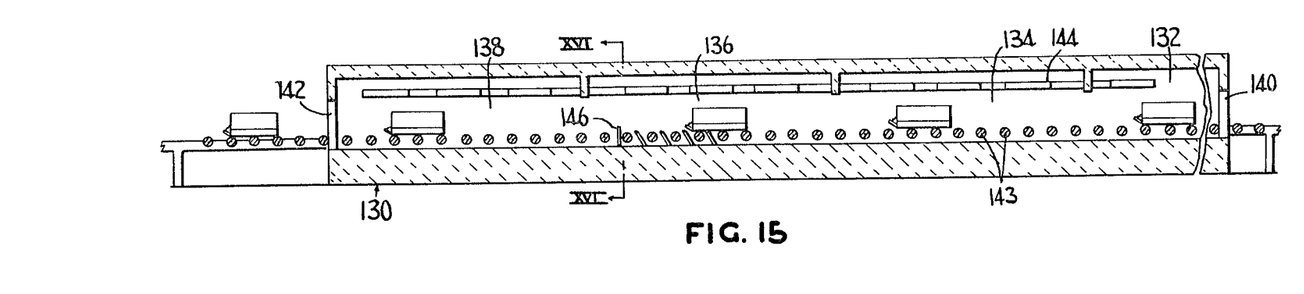
FIGURE 15 is a longitudinal elevation partly in section of a bending lehr showing the location of various tripping mechanisms along the length of the lehr with bending molds shown schematically therein.
Figure 16:
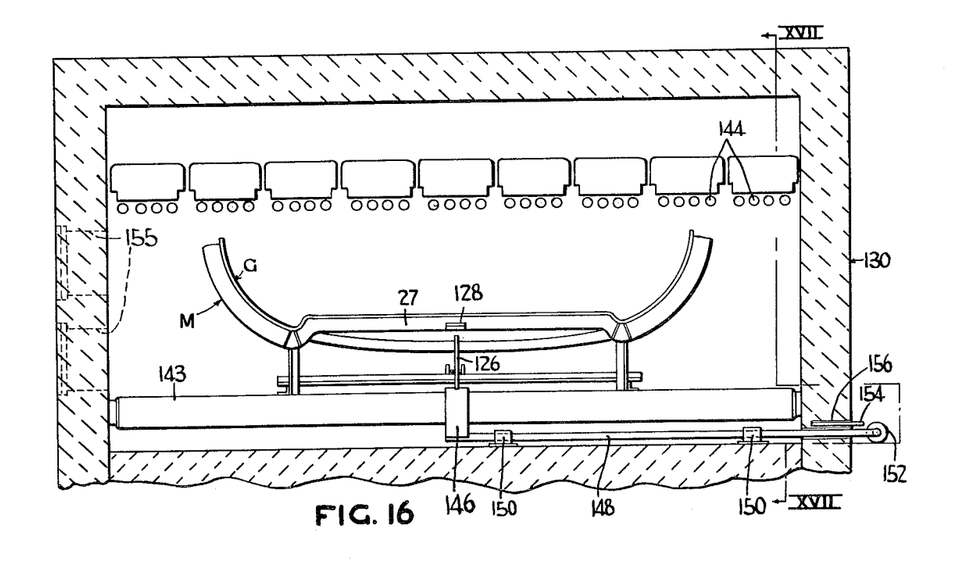
FIGURE 16 is a cross-section taken along the lines XVI—XVI of FIGURE 15 with a bending mold shown schematically.
Figure 17:
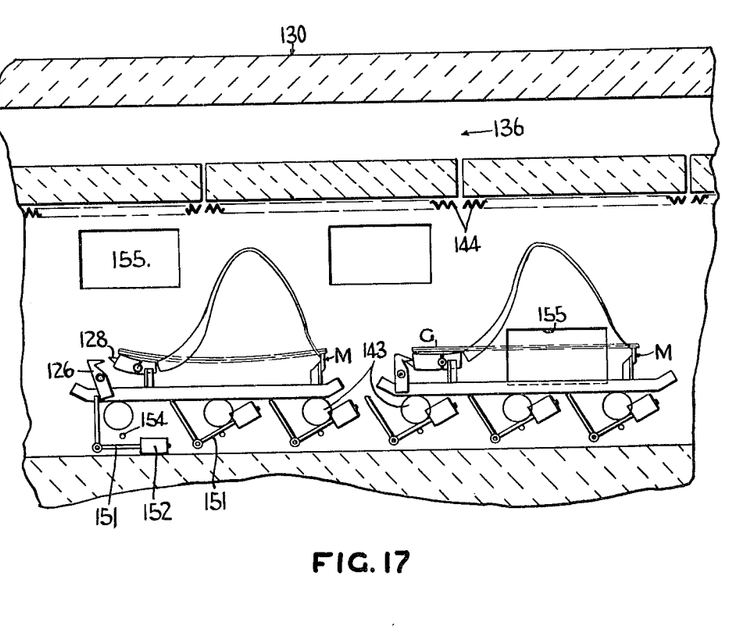
FIGURE 17 is an enlarged detailed elevation of a portion of a lehr taken along the lines XVII—XVII of FIGURE 16, with the bending molds in this section shown schematically.
Figure 18:
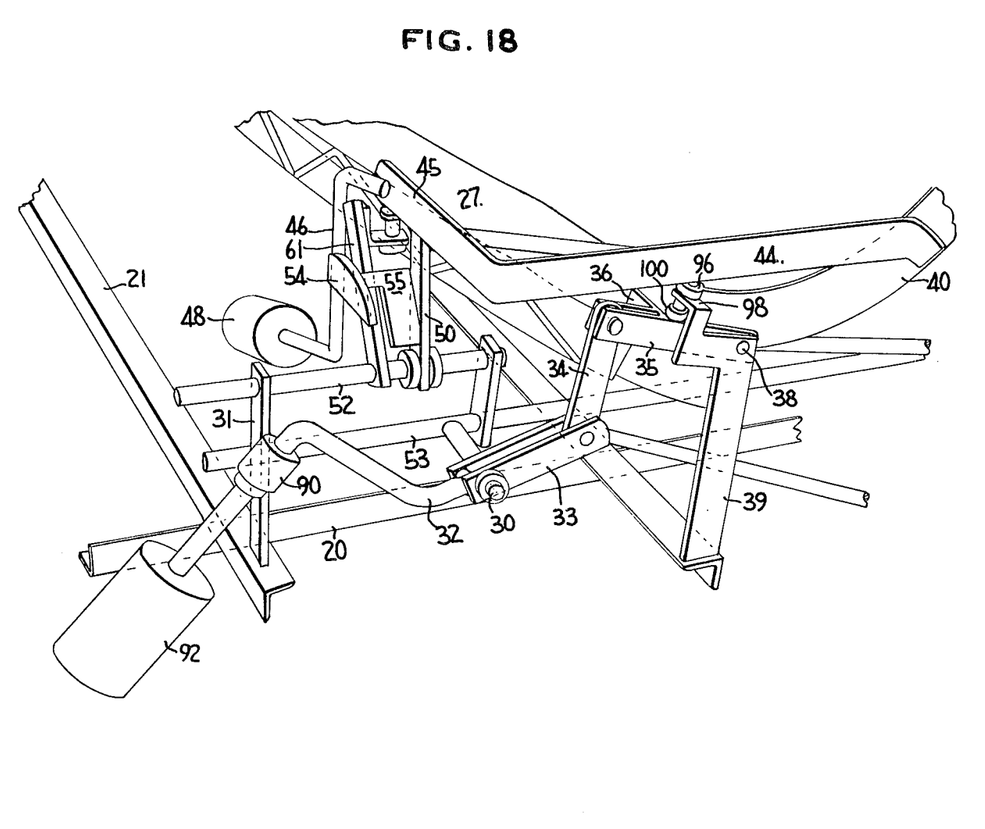
FIGURES 18 and 19 are detailed fragmentary perspective views of an illustrative embodiment of means inhibiting pivoting of a movable mold element by locking the element in a fixed position, tripping means for moving the inhibiting means out of locking position and actuating means for pivoting said movable mold element according to the present invention.
Figure 19:
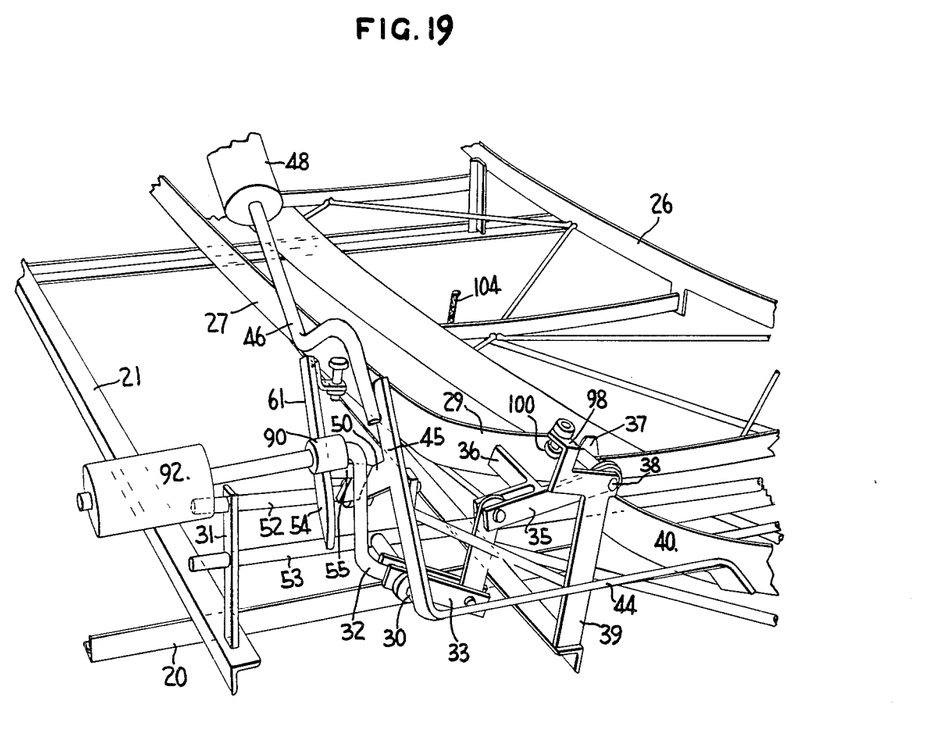

The operation of a typical mold provided with the hook and latch depicted in FIGURES 13 and 14 will be better understood by studying FIGURES 15 through 17. These figures depict a typical bending lehr 130 provided with a perheat section 132, a longitudinal bending section 134, a transverse bending section 136 and an annealing section 138. The lehr has an entrance 140 at the begining of its preheat section and an exit 142 at the exit end of its annealing section. Conveyor rolls 143 are rotated about axes transverse of the lehr to move the mols M through the lehr.

Electrical heaters 144 are mounted above the passage for the molds and are provided with electrical energy from a voltage source (not shown). The electrical input and the location of each heater 144 relative to the moving glass sheets may be adjusted so as to vary the heat imparted into localized regions across their longitudinal dimension to help provide the complex longitudinal bend desired. The molds M are conveyed sidewise through the lehr along the conveyor rolls 143.

In the transverse bending section 136, a number of vertically adjustable lugs 146 are provided. These lugs are spaced longitudinally of the lehr between conveyor rolls 143 and are aligned axially. Each lug 146 is fixed to a rotatable rod 148 extending through and supported by bearing brackets 150. Bearing rod 148 is bent to form an arm 151 provided with a counterweight 152. The latter causes the lug 146 to rotate from an oblique position to a vertical position. A stop pin 154 slidable in a recess 156 prevents the counterweight 152 from causing lug 146 to be rotated into its vertical position when the stop pin 154 is moved outwardly beneath the counterweighted arm 151.

Lug 146 is so dimensioned that when counterweighted arm 151 is supported by the stop pin 154, both the mold carriage and the bottom of the latch 126 clear the lug. However, when stop pin 154 is pushed into the recess 156 to disengage the counterweighted arm 151, thus causing lug 146 to be rotated to its vertical position, lug 146 is met by the bottom of latch 126 upon movement of the mold through the lehr. The moment provided by counterweight 152, while sufficiently large to rotate lug 146 into its vertical position, is insufficient to prevent counter-rotation of the lug 146 upon abutment by portions of the rigid mold supporting frame as the latter pass through the transverse bending portion of the lehr.

Windows 155 are provided along the length of the lehr to insure sufficient opportunity for observing the glass bending cycle. The particular location at which the latch 126 is tripped may be selected from any one of the locations possible merely by selecting a particular stop pin 154 to actuate the proper lug 146. This optimum location depends upon the particular pattern of the glass to be bent, the heating configuration within the beinding lehr, and the speed of mold movement through the lehr, which determine the rate of bending.

For a particular example wherein the sheet of FIGURE 1 is to be bent so that its wing portions 16 and 17 are to be bent sharply longitudinally of the sheet and the auxiliary portion 18 is to bent sharply transversely of the sheet, the heating pattern imparted to the various sections of the lehr is important. In the preheat section 132, each row of heaters extending transversely of the longitudinal axis of the movement of the glass is heated to impart a uniform transverse temperature pattern to the glass and mold passing therebeneath. Each succeeding row of heaters in the preheat section imparts heat at a higher intensity to the passing glass and mold.

In the longitudinal bending section 134, the heaters 144 are energized in a different pattern. The heaters in each row are energized to different intensities so that the column of heaters overlying those regions of glass destined for severe curvatures are energized to higher voltages than the other heaters in this lehr section. The heat intensity pattern intersected by the glass sheets in their lateral movement through lehr section 134 comprises two spaced regions of high intensity separated by a region of relatively moderate intensity. The bending moments resulting from the mechanical forces of the counterweighted outboard molding members 40 on the glass act locally on the strips of glass passing beneath the columns of high intensity heaters, thus helping to impart the severe curvature in the proper locations along the longitudinal bend.

In the transverse bending section 136, the intensity pattern across the rows of heaters 144 is more uniform than in the longitudinal bending section. In this section, the rotation of the rail member 27 imparts the localized transverse curvature to the glass, which is still in the region of glass softening temperatures. In the embodiment depicted in FIGS. 12 to 17, the upper end of latch 126 cooperates with eye 128 to serve as alternative inhibiting means operatively connected to pivotable rail 27, the selected lug cooperates with the bottom end of latch 126 to provide alternative tripping means for moving the alternative inhibiting means out of operative connection with pivotable rail 27 and counterweights 92 serve as actuating or urging means to rotate the pivotable rail 27. The tripping means in this latter embodiment is manually operated through the control exercised by the position of stop pins 154 relative to arms 151.

In the annealing section 138, each row of heaters is heated in such a manner as to equalize the temperature throughout the glass sheet and to provide for cooling of the glass as it proceeds through this section. Such an intensity pattern need not be uniform across any row of heaters.

Figure 20:
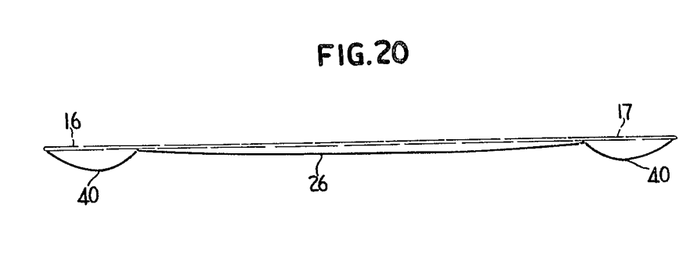
FIGURE 20 is a schematic longitudinal elevation showing how a flat glass sheet is supported on a mold preparatory to bending.
Figure 21:
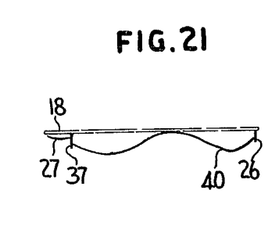
FIGURE 21 is an end view of the flat glass sheet supported on a mold preparatory to bending as shown in FIGURE 20.
Figure 22:
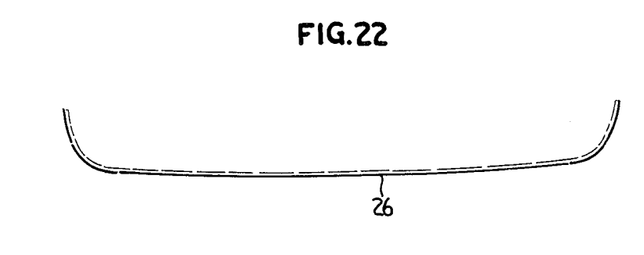
FIGURES 22 and 23 are schematic longitudinal and end views similar to FIGURES 20 and 21, respectively, showing how a glass sheet is supported on the mold after the first stage of longitudinal bending is completed.
Figure 23:
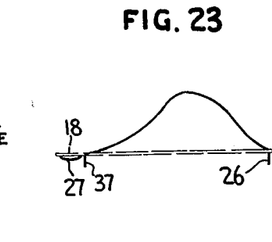
Figure 24:
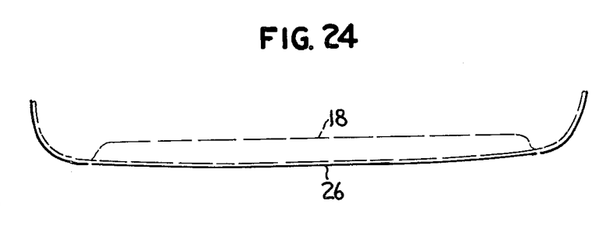
FIGURES 24 and 25 are views similar to those of FIGURES 22 and 23, respectively, showing how a glass sheet is supported on the mold after both the longitudinal and transverse bends are completed.
Figure 25:
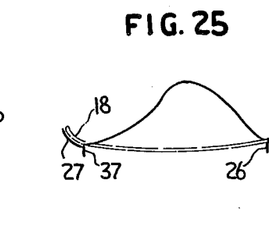

FIGURES 20 to 25 illustrate schematically how the glass is supported on a mold when subjected to the bending cycle suggested by the present invention. In FIGURES 20 and 21, the flat glass is shown supported on a mold whose wing sections 40 and rotatable rail 27 are rotated downwardly into a flat glass supporting position. FIGURES 22 and 23 show how the glass sheet emerges from the longitudinal bending section 134 with the wing sections rotated into their closed positions after having provided upward lifting force to rotate the glass sheet wing portions 16 and 17 and substantially complete the longitudinal bend before the rotatable rail 27 is released to apply an upward lifting force to auxiliary portion 18 of the glass sheet. FIGURES 24 and 25 show how the glass sheet is supported on the mold after it has been bent to the compound shape desired and after the glass traverses the transverse bending section 136 wherein rotatable rail 27 is rotated upward and inward to apply an upward lifting force onto auxiliary portion 18.

Once the transverse bend is completed as viewed through the lehr windows, the molds may be accelerated toward the annealing section by coupling high speed motors to the desired conveyor rolls by means of selective clutches (not shown). However, when the lehr is adjusted properly and a large batch of sheets is to be bent to a particularl shape, the molds are conveyed through the lehr at a constant speed.

The forms of the invention shown and described herein represent an illustrative preferred embodiment and certain modifications thereof. It is understood that various changes may be made without departing from the spirit of the invention as recited in the claimed subject matter which follows:

What is claimed is:
1. A method of bending glass sheets into compound bends including a longitudinal bend of non-uniform curvature and a transverse bend of non-uniform curvature comprisig supporting a flat sheet to be bent on a bending mold having an upper shaping surface, conveying the supported glass sheet through a region subjected to glass softening temperature, applying mechanical force to the longitudinal extremities of the heat-softened glass sheet to impart a longitudinal bend to the sheet and then applying an upward lifting force along one side portion only of the sheet to impart a transverse bend to the sheet.

2. A method of bending glass sheets into compound bends including a longitudinal bend of non-uniform curvature and a transverse bend of non-uniform curvature comprising supporting a flat sheet to be on a bending mold having an upper shaping surface, conveying the supported glass sheet through a region subjected to glass softening temperature, applying mechanical force to the longitudinal extremities of the heat-softened glass sheet to impart a longitudinal bend to the sheet and then applying an upward lifting force along one side portion only of the sheet while supporting the other side portion thereof to impart a transverse bend to the sheet.

References Cited by the Examiner
UNITED STATES PATENTS 2,551,606   5/1951   Jendrisak ___________ 65—190

DONALL H. SYLVESTER, *Primary Examiner.*

ALLEN B. CURTIS, ARTHUR P. KENT, *Examiners.*